Figure 8:
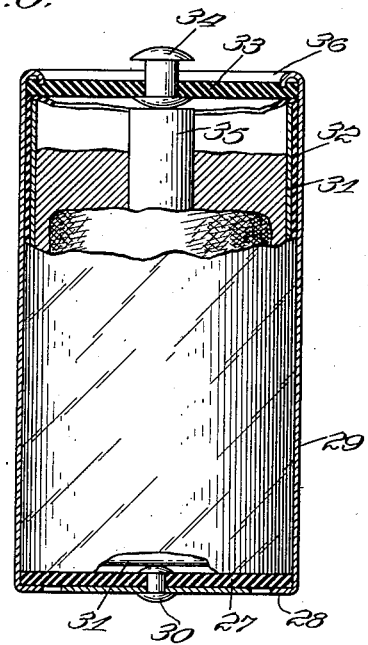

April 23, 1940.  H. R. C. ANTHONY  2,198,423
LEAKPROOF DRY CELL
Filed May 31, 1938  2 Sheets-Sheet 1
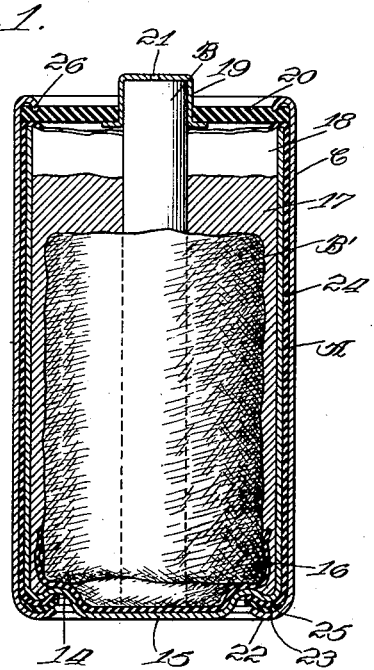
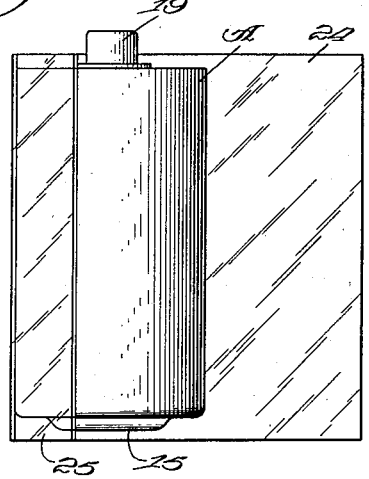
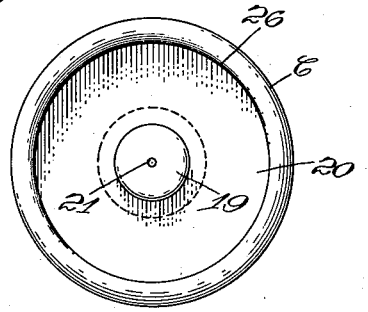
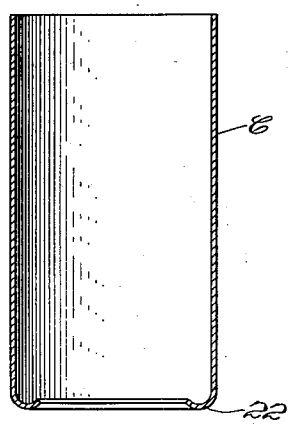
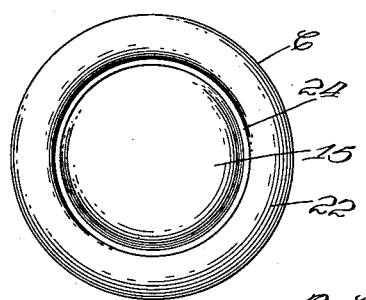
Inventor:
Herman R. C. Anthony.
By Chitton, Wilts, Davis, Hirschl & Dawson
Attys.

April 23, 1940.  H. R. C. ANTHONY  2,198,423
LEAKPROOF DRY CELL
Filed May 31, 1938  2 Sheets-Sheet 2

Inventor:
Herman R. C. Anthony.
By Stritter, Wiles, Davis, Hirsch & Dawson.
Attys.

Patented Apr. 23, 1940

2,198,423

UNITED STATES PATENT OFFICE 2,198,423

LEAKPROOF DRY CELL

Herman R. C. Anthony, Madison, Wis., assignor to Ray-O-Vac Company, a corporation of Wisconsin Application May 31, 1938, Serial No. 211,073

8 Claims. (Cl. 136—107)

This invention relates to dry-cells of the type used in flash light casings and the like, and more particularly to an improved protective casing for a cell which will prevent fluids from leaking out of the cell and causing injury to the casing or other dry-cells within the casing.

In using dry-cells it has been a common experience that if the cell is short circuited, or placed under a heavy load for a considerable length of time, the cell will expand and liquids leak out through the walls of the cell. The liquids usually include zinc chloride and ammonium chloride and will, in a short time, injure the metal walls of the casing which are commonly made of brass. If the cell is allowed to remain in the casing for a considerable length of time, it will often swell and freeze to the casing so that it is very difficult to remove it. Frequently two or more cells are used in a single casing and electrolyte leaking from one cell to another will short circuit the adjacent cell so as to destroy its usefulness and aggravate the damage to the casing.

Flash light cells usually are manufactured with a wax coated disk in the bottom part of the cell or cup which partially embraces the end of the depolarizing-mix and retards the action of the electrolyte on the bottom wall of the cup. As a result of this protection, the cup usually gives out first at its side walls, slightly above the bottom, and this is where the electrolyte is most likely to leak out after the cell has been in use for a long period. By protecting the side walls of the cup most of the danger of leakage is avoided, but in some cases it is desirable to provide additional protection for the bottom and top of the cell.

Another object of the present invention is to provide a strong metal sheath which will closely and rigidly confine the cell to a given length and diameter. It has been found that without such protection cells frequently swell so much in diameter that they stick in the casing and sometimes elongate sufficiently to damage the casing. The zinc commonly used as an electrode and as a cup for the electrolyte is too weak by itself to prevent such action.

Another object of the invention is to provide a strong metal sheath or jacket which may be insulated from both terminals of the cell so that it will be unnecessary to use an insulating cover or label to prevent the cell from short circuiting on the side walls of the casing.

Figure 9:
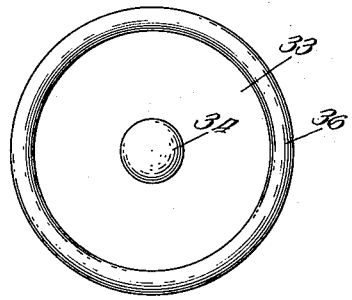
Figure 10:
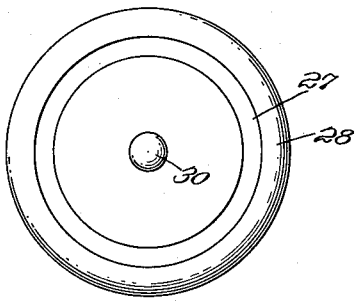
Figure 11:
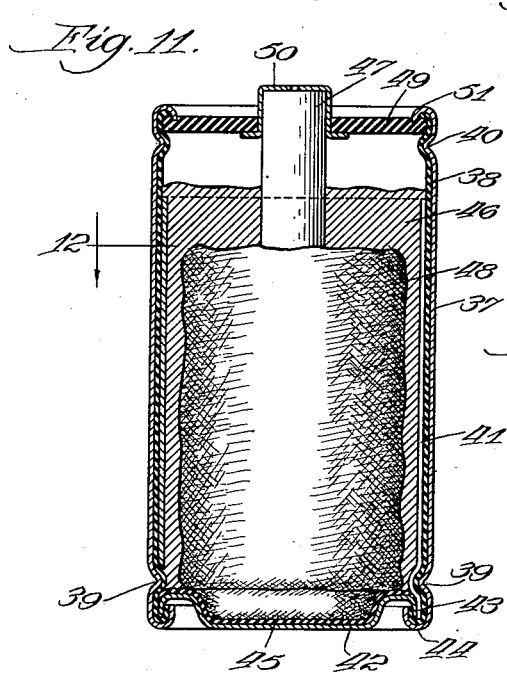
Figure 12:
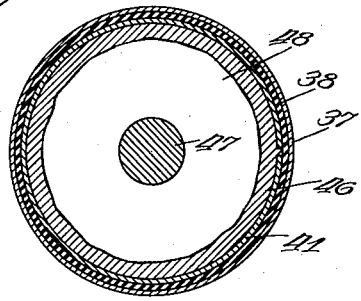
Figure 13:
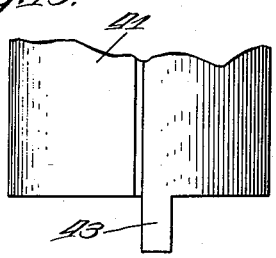

The invention is illustrated in preferred embodiments in the accompany drawings, in which:

Fig. 1 is a vertical sectional view of a leak-immunized dry-cell embodying the invention; Fig. 2 is a top plan view of the same; Fig. 3 is a bottom plan view; Fig. 4 is a sectional view of the top closure; Fig. 5 is an elevational view showing an insulating wrapper which is preferably provided between the electrode cup and steel jacket; Fig. 6 is a sectional view of an insulating washer, preferably of rubber, which may be applied between the bottom wall of the cell and the inturned flange of the sheath; Fig. 7 is a sectional view of the metal sheath; Fig. 8 is a fragmentary sectional view showing a modified form of leak-immunized dry-cell; Fig. 9 is a plan view of the top of the cell shown in Fig. 8; Fig. 10 is a bottom plan view of the same; Fig. 11 is a sectional view of another modified form of leakproof cell; Fig. 12 is a sectional view, taken as indicated at line 12 of Fig. 11; and Fig. 13 is a fragmentary elevational view of the zinc electrode used in the device shown in Fig. 11.

In the embodiment illustrated in Figs. 1–7, inclusive, A designates a zinc cup which serves as a negative electrode for the cell; B, a carbon electrode provided with a depolarizing-mix B'; and C, a metal sheath which encloses the cell.

The cup A preferably has an annular groove 14 in its bottom wall to provide a flange to be gripped by the lower flange of the steel jacket and enable an end portion 15 to be flush with the lower end of the jacket. In making up the cell a paper sheet or disk 16 may be placed in the bottom of the cup and bonded to the zinc by heat or pressure to protect the end. A similar protection can be provided by pouring into the can asphalt, wax, or other free flowing and self-hardening material. Electrolyte 17 is poured into the casing, and the carbon pole B with its depolarizating-mix B' forced down into the cup so that the electrolyte will well-up towards the top of the casing but will allow an air space 18 for gas pressure. Preferably the upper end of the carbon pole B is provided with a flanged cap 19 which snugly fits into an aperture provided in an insulating disk 20 which forms an end closure for the cell. A perforation 21 in the end cap permits venting of gas through the carbon terminal.

The sheath C preferably is made of sheet iron and may be of tubular form with its lower end turned inwardly to form a flange 22. A rubber sealing washer 23 may be placed on the flange 22 before the cell is inserted. In most cases it is desirable to insulate the casing A from the jacket C, and this may be done by wrapping a sheet 24 of insulating material such as rubber, treated paper or the like, around the cell and tucking the lower ends 25 inwardly. The cell is then forced into the jacket and pressed firmly against the washer 23. The top closure 20 is then forced over the cap 19 and the top edges of the steel jacket are spun inwardly so that the jacket tightly embraces both ends of the cell. Preferably, a spun flange 26 bites into a groove provided in the closure 20 so that a very tight joint is provided.

With a cell of the character above described, internal pressure formed by gas and expansion of the electrolyte during use will further tighten the end joints so that no liquid can escape. The air space 18 permits expansion of the electrolyte and the gas may slowly escape through the perforation 21.

If desired, the outer walls of the casing C may be polished and lacquered so as to provide a very attractive appearance and suitable surface for a decalcomania transfer label. In the event that the insulating sheet 24 is omitted, a suitable insulating cover of cardboard or the like should be provided.

In the embodiment illustrated in Figs. 8–10, inclusive, an insulating closure 27 is provided to rest on the inside of an end flange 28 of a steel jacket 29. A rivet-like terminal 30 is centrally disposed in the closure member so as to make contact with the bottom of a zinc cup 31. Preferably, an insulating sheet 32 separates the steel jacket from the zinc cup. A top closure 33 is also an insulating disk provided with a terminal 34 adapted to contact a carbon electrode 35. After the device has been assembled, an end flange 36 may be spun into the disk 33. It may be noted in this form that the cell is fully enclosed at both ends and internal pressure will further tighten the connection.

In the modification shown in Figs. 11–13, a zinc cup is not used but the cell is built up within a tubular steel casing 37 in the following manner. A sleeve of insulating material 38 is placed within the cylindrical shell 37 and grooves 39 and 40 are turned in the casing to provide abutments for the end closures. A curled sheet of zinc 41 is attached to bottom wall 42 by means of a finger 43 and the base is then gripped against the abutment formed by the groove 39 by spinning the lower end of the jacket 37 around the edges of the bottom wall 42, as indicated at 44. The bottom wall is protected from the action of the electrolyte by means of an inert disk or sealing wax 45. After electrolyte 46 has been poured into the container, the carbon pole 47 with the usual depolarizing-mix 48 is introduced and the insulating closure 49 is fitted over the cap 50 and against the abutment formed by the groove 40. The upper end of the casing 37 is then spun tightly against the end closure, as indicated at 51, and the cell is ready for use.

As will be readily understood, the inside of the sheet-metal jacket may be sprayed with suitable insulating material, such as emulsified asphalt or the like, instead of using a sheet or collar of insulating material.

The foregoing detailed description has been given for clearness of understanding only, and no unnecessary limitations should be understood therefrom, for modifications will be obvious to those skilled in the art.

I claim:
1. A leak-immunized flash light dry-cell provided with circuit terminals at opposite ends, comprising: a hollow cylindrical zinc metal electrode containing electrolyte; a centrally disposed carbon electrode and depolarizing-mix in said electrolyte; a bottom closure for the cell affording a terminal for one of the electrodes; a top closure for the cell provided with a terminal for the other electrode, electrically insulated from the first mentioned terminal; and a protecting sheet-metal sheath insulated from both of said electrodes and enclosing the side walls of said metal electrode and tightly embracing said closures so as to prevent leakage of the electrolyte from the unit.

2. A device as specified in claim 1, in which the sheet-metal sheath is insulated from both of the electrodes by an interposed sleeve of paper which has been treated to render it moisture resistant and electrically non-conductive.

3. A device as specified in claim 1, in which the marginal end portions of the metal sheath are turned inwardly to form flanges which overlap the end closures.

4. In combination: a cell provided with circuit terminals at opposite ends; and a liquid tight housing completely enclosing said cell, said housing having a sheet-metal side wall and end walls provided with exposed contact members insulated from each other and insulated from the sheet-metal side wall, each of said contacts being in electrical engagement with one of the cell terminals.

5. A unit as specified in claim 4, in which the end walls of the housing comprise disks of strong insulating fibrous material and the contact members are embedded in said disks.

6. A dry-cell comprising: a tubular shell of ferrous sheet-metal having an inner coating of acid resisting material, a metallic base closure fixed to the lower end of said shell and insulated therefrom; a metal electrode in said shell electrically connected to the base closure; a centrally disposed carbon electrode and depolarizing-mix in the shell; electrolyte partially filling said shell; and a top closure of insulating material fixed to the upper end of the shell to seal the cell against the escape of liquid and having a terminal member insulated from said shell and making electrical contact with said carbon electrode.

7. A unit as specified in claim 6, in which the shell has inwardly directed grooves forming abutments for the end closures, and the end closures are hermetically sealed against said abutments by the ends of the shell clamping thereagainst.

8. A unit as specified in claim 6, in which the metal electrode comprises an open ended curved sheet of zinc.

HERMAN R. C. ANTHONY.